US007689432B2

(12) United States Patent
Gross (10) Patent No.: US 7,689,432 B2
(45) Date of Patent: Mar. 30, 2010

(54) SYSTEM AND METHOD FOR INFLUENCING RECOMMENDER SYSTEM & ADVERTISING BASED ON PROGRAMMED POLICIES

(75) Inventor: John N. Gross, San Francisco, CA (US)

(73) Assignee: Hayley Logistics LLC, Las Vegas, NV (US)

( * ) Notice: Subject to any disclaimer, the term of this patent is extended or adjusted under 35 U.S.C. 154(b) by 1342 days.

(21) Appl. No.: 10/863,743

(22) Filed: Jun. 7, 2004

(65) Prior Publication Data

US 2004/0260574 A1 Dec. 23, 2004

Related U.S. Application Data

(60) Provisional application No. 60/476,341, filed on Jun. 6, 2003.

(51) Int. Cl.
*G06Q 99/00* (2006.01)
(52) U.S. Cl. .......................................................... 705/1
(58) Field of Classification Search ...................... 705/1
See application file for complete search history.

(56) References Cited

U.S. PATENT DOCUMENTS

| | | | |
|---|---|---|---|
| 4,870,579 A | 9/1989 | Hey | |
| 4,996,642 A | 2/1991 | Hey | |
| 5,459,306 A | 10/1995 | Stein et al. | |
| 5,717,865 A | 2/1998 | Stratmann | |
| 5,884,282 A | 3/1999 | Robinson | |
| 5,901,246 A | 5/1999 | Hoffberg et al. | |
| 5,903,454 A | 5/1999 | Hoffberg et al. | |
| 5,918,014 A | 6/1999 | Robinson | |
| 5,974,398 A | 10/1999 | Hanson et al. | |
| 6,064,980 A | 5/2000 | Jacobi et al. | |
| 6,266,649 B1 | 7/2001 | Linden et al. | |
| 6,314,420 B1 | 11/2001 | Lang et al. | |
| 6,389,372 B1 | 5/2002 | Glance et al. | |
| 6,418,424 B1 | 7/2002 | Hoffberg et al. | |

(Continued)

FOREIGN PATENT DOCUMENTS

| | | |
|---|---|---|
| WO | WO 98/34189 | 8/1998 |
| WO | WO01/46930 | 6/2001 |
| WO | WO02/25937 | 3/2002 |
| WO | WO02/37840 | 5/2002 |
| WO | WO 03/088107 A2 | 10/2003 |
| WO | WO 2004/052010 | 6/2004 |
| WO | WO 2004/053757 | 6/2004 |

OTHER PUBLICATIONS

Solomon, Mary "Targeting Trendsetters: Cyberstudies capture the perceptions and insights of early adopters" Marketing Research Summer 1996, vol. 8, No. 2.*

(Continued)

*Primary Examiner*—Jonathan Ouellette
(74) *Attorney, Agent, or Firm*—Sterne, Kessler, Goldstein & Fox P.L.L.C.

(57) ABSTRACT

A system and method for influencing a recommender system and advertising uses a controlled, programmed policy. The recommender system uses the policy to adjust recommendations made to users for particular items, so that a policy holder receives some measure of preference in recommendations. The preference may be implemented in the form of a filter, or a presentation of items. The policy can be applied selectively, and be based on pay for placement type consideration, demographics, time, and other related parameters. Advertising for the users can be similarly adjusted in coordination with the policy.

46 Claims, 2 Drawing Sheets

U.S. PATENT DOCUMENTS

| | | | |
|---|---|---|---|
| 6,484,123 B2 | 11/2002 | Srivastava | |
| 6,526,440 B1 | 2/2003 | Bharat | |
| 6,600,898 B1 | 7/2003 | De Bonet et al. | |
| 6,609,096 B1 | 8/2003 | De Bonet et al. | |
| 6,687,696 B2 | 2/2004 | Hofmann et al. | |
| 6,697,800 B1 | 2/2004 | Jannink et al. | |
| 6,735,572 B2* | 5/2004 | Landesmann | 705/14 |
| 6,766,525 B1 | 7/2004 | Lee et al. | |
| 6,775,664 B2 | 8/2004 | Lang et al. | |
| 6,782,370 B1 | 8/2004 | Stack | |
| 6,801,909 B2 | 10/2004 | Delgado et al. | |
| 6,853,982 B2* | 2/2005 | Smith et al. | 705/27 |
| 6,912,505 B2 | 6/2005 | Linden et al. | |
| 7,043,531 B1* | 5/2006 | Seibel et al. | 709/206 |
| 7,113,917 B2 | 9/2006 | Jacobi et al. | |
| 7,155,401 B1 | 12/2006 | Cragun et al. | |
| 7,356,490 B1* | 4/2008 | Jacobi et al. | 705/27 |
| 2002/0042733 A1 | 4/2002 | Lesandrini et al. | |
| 2002/0078056 A1 | 6/2002 | Hunt et al. | |
| 2002/0097265 A1 | 7/2002 | Kurapati et al. | |
| 2002/0123988 A1 | 9/2002 | Dean et al. | |
| 2002/0133417 A1 | 9/2002 | Hanks et al. | |
| 2002/0154157 A1 | 10/2002 | Sherr et al. | |
| 2002/0174429 A1 | 11/2002 | Gutta et al. | |
| 2002/0180805 A1 | 12/2002 | Chickering et al. | |
| 2002/0184139 A1 | 12/2002 | Chickering et al. | |
| 2002/0194079 A1 | 12/2002 | Kimble | |
| 2003/0033292 A1 | 2/2003 | Meisel et al. | |
| 2003/0036944 A1 | 2/2003 | Lesandrini et al. | |
| 2003/0046156 A1 | 3/2003 | Cromer et al. | |
| 2003/0050805 A1 | 3/2003 | Gouyet et al. | |
| 2003/0050815 A1* | 3/2003 | Seigel et al. | 705/7 |
| 2003/0055816 A1 | 3/2003 | Paine et al. | |
| 2003/0055898 A1 | 3/2003 | Yeager et al. | |
| 2003/0074253 A1 | 4/2003 | Scheuring et al. | |
| 2003/0093329 A1 | 5/2003 | Gutta | |
| 2003/0093331 A1 | 5/2003 | Childs et al. | |
| 2003/0093338 A1 | 5/2003 | Kim et al. | |
| 2003/0093793 A1 | 5/2003 | Gutta | |
| 2003/0097302 A1 | 5/2003 | Overhultz et al. | |
| 2003/0135490 A1 | 7/2003 | Barrett et al. | |
| 2003/0135513 A1 | 7/2003 | Quinn et al. | |
| 2003/0149614 A1 | 8/2003 | Andrus et al. | |
| 2003/0167195 A1* | 9/2003 | Fernandes et al. | 705/8 |
| 2003/0195793 A1* | 10/2003 | Jain et al. | 705/10 |
| 2003/0204449 A1 | 10/2003 | Kotas et al. | |
| 2003/0208399 A1 | 11/2003 | Basak et al. | |
| 2003/0208578 A1 | 11/2003 | Taraborelli et al. | |
| 2003/0212619 A1 | 11/2003 | Jain et al. | |
| 2003/0216942 A1 | 11/2003 | Hawks | |
| 2003/0233278 A1 | 12/2003 | Marshall | |
| 2004/0015386 A1* | 1/2004 | Abe et al. | 705/10 |
| 2004/0030525 A1 | 2/2004 | Robinson et al. | |
| 2004/0034570 A1 | 2/2004 | Davis | |
| 2004/0054572 A1 | 3/2004 | Oldale et al. | |
| 2004/0068451 A1 | 4/2004 | Lenk et al. | |
| 2004/0073919 A1 | 4/2004 | Gutta et al. | |
| 2004/0076936 A1 | 4/2004 | Horvitz et al. | |
| 2004/0088303 A1 | 5/2004 | Elder et al. | |
| 2004/0088730 A1 | 5/2004 | Gopalan et al. | |
| 2004/0103092 A1 | 5/2004 | Tuzhilin et al. | |
| 2004/0116067 A1 | 6/2004 | Karaoguz et al. | |
| 2004/0122686 A1* | 6/2004 | Hill et al. | 705/1 |
| 2004/0148275 A1 | 7/2004 | Achlioptas | |
| 2004/0167814 A1 | 8/2004 | Hawks | |
| 2004/0172267 A1 | 9/2004 | Patel et al. | |
| 2004/0215733 A1 | 10/2004 | Gondhalekar et al. | |
| 2004/0220826 A1 | 11/2004 | Hey | |
| 2004/0225577 A1 | 11/2004 | Robinson | |
| 2004/0230546 A1 | 11/2004 | Rogers | |
| 2004/0254857 A1 | 12/2004 | Onizuka | |
| 2005/0021499 A1 | 1/2005 | Bradley et al. | |
| 2005/0066350 A1 | 3/2005 | Meuleman | |
| 2005/0086300 A1 | 4/2005 | Yeager et al. | |
| 2005/0120006 A1 | 6/2005 | Nye | |
| 2005/0125309 A1* | 6/2005 | Song | 705/26 |
| 2005/0203807 A1* | 9/2005 | Bezos et al. | 705/26 |
| 2006/0100956 A1 | 5/2006 | Ryan et al. | |

OTHER PUBLICATIONS

Morgan, Fred, Jr. "Are Early Triers Heavy Users?" The Journal of Business, vol. 52, No. 3 (Jul. 1979), pp. 429-434.*

Greco, Alan J.; Fields, D. Michael, "Profiling Early Triers of Service Innovations: A Look at Interactive Home Vid . . . ", The Journal of Services Marketing; Summer 1991; 5, 3; p. 19.*

Harold Zane Daniel, Jr., "The Role of MARKR-Entry Timing In The Evaluation of Manufacturing Technology Innovations", dissertation, University of Connecticut, 1997.*

Patrick Y.K. Chau, Kai Lung Hui, "Identifying early adopters of new IT products: A case of Windows 95", Information & Managegment 33 (1998) 225-230.* http://www.amazon.com/gp/earlyadopter/browse.html/ref=cm_ea_pdp/102-4825329-5718538?categoryID=2&filterID=-1, Mar. 9, 2004, 1 page.

Andrew Chen, "Forecasting Gross Revenues at the Movie Box Office," ECON 482, Econometric Methods, Final Paper, Jun. 4, 2002, 20 pages.

Tal Garber et al., "From Density to Destiny: Using Spatial Analysis for Early Prediction of New Product Success," Marketing Science Institute Working Paper No. 02-106, Feb. 2002, 44 pages.

Nicholas Kushmerick, "Robustness analyses of instance-based collaborative recommendation," believed to be published in *Proceedings of European Conference on Machine Learning* (Helsinki), 2002, 12 pages.

Shyong K. Lam et al., "Shilling Recommender Systems for Fun and Profit," believed to be published in *Proceedings International WWW Conference*, New York, USA, 2004, pp. 393-402.

Steve Lawrence, "Implicit feedback: Good may be better than best," Workshop on Implicit Measures of User Interests and Preferences, Aug. 2003, 47 pages.

Paolo Massa, et al.,"Trust-aware Collaborative Filtering for Recommender Systems," Published in International Conference on Cooperative Information Systems (CoopIS) 2004, 17 pages.

Greg Notess, "Freshness Issue and Complexities with Web Search Engines," http://www.onlinemag.net/OL2001/net11_01.html, Nov. 2001, 5 pages.

Douglas Oard, et al., "Protecting the Privacy of Observable Behavior in Distributed Recommender Systems," Presented at the SIGIR Workshop on Implicit Methods in Toronto in Aug. 2003, 17 pages.

Matthew Richardson, et al., "The Intelligent Surfer: Probabilistic Combination of Link and Content Information in PageRank," believed to be published in *Advances in Neural Information Processing Systems 14*, Cambridge, MA: MIT Press, 2002, 8 pages.

Andrew Weigend, "Analyzing Customer Behavior at Amazon.com," KDD 2003, Washington, DC, 7 pages.

Jie Wu, et al., "Semantic web graph implied by user preferred activities," Workshop on Implicit Measures of User Interests and Preferences, Aug. 1, 2003, 14 pages.

http://www.amazon.com/exec/obidos/tg/browse/-/3072321/ref=pd_rhf_c_1/104-4844530-6855147 by Amazon Mar. 2003.

Adomavicius, Gediminas, et al., "Extending Recommender Systems: A Multidimensional Approach," IJCAI-01 Workshop on Intelligent Techniques for Web Personalization (ITWP'2001), Seattle, Washington, Aug. 2001, 5 pgs.

Arasu, A., et al., "PageRank Computation and the Structure of the Web: Experiments and Algorithms," Technical Report, IBM Almaden Research Center, San Jose, CA, Nov. 2001, 5 pages.

Baeza-Yates, Ricardo, et al., "Web Structure, Age and Page Quality," http://www.dcs.bbk.ac.uk/webDyn2/proceedings/baeza_yates web structure.pdf, 12 pages.

Barroso, Luiz Andre, et al., "Web Search for a Planet: The Google Cluster Architecture," IEEE Micro vol. 23, Issue 2 (Mar. 2003) pp. 22-28.

Brin, Sergey, et al., "The anatomy of a large-scale hypertextual web search engine," believed to be published in Proceedings of the 7 International World Wide Web Conference, Brisbane, Australia, 1997, vol. 3, ACM Press, 23 pages.

Brin, Sergey, et al., "The PageRank Citation Ranking: Bringing Order to the Web," http://www.actonvision.com/GooglePageRank1.html, Jan. 28, 1998, 13 pages.

Davison, Brian, "Overview: WWW Search Engines," www.cse.lehigh.edu/~heflin/courses/semweb/se-overview.pdf, 2003, 38 pages.

Diaz, Fernando, et al., "Temporal Profiles of Queries," Yahoo Research Labs Technical Report, Pasadena, CA, 2004, 9 pages.

Emergent Music Website at: http://www.emergentmusic.com, accessed on Dec. 9, 2004, 16 pages.

Flake, Dr. Gary, "Self-Organization of the Web and Identification of Communities," press release from NEC Research Institute, Mar. 6, 2002, 1 page.

Geyer-Schulz, Andreas, et al., "Comparing Two Recommender Algorithms with the Help of Recommendations by Peers," In O.R. Zaiane, J. Srivastava, M. Spiliopoulou, and B. Masand, editors, WEBKDD 2002—Mining Web Data for Discovering Usage Patterns and Profiles 4th International Workshop, Edmonton, Canada, Jul. 2002, Revised Papers, Lecture Notes in Computer Science LNAI 2703, pp. 137-158. Springer-Verlag, 2003, 23 pages.

Ghani, Rayhid, et al. "Using Text Mining to Infer Semantic Attributes for Retail Data Mining," IEEE International Conference on Data Mining, Dec. 9-12, 2002. Maebashi, Japan, 8 pages.

Goombah website at: http://goombah.emergentmusic.com, accessed on Dec. 9, 2004, 9 pages.

Greco, Alan J. et al., "Profiling Early Triers of Service Innovations: A Look at Interactive Home Vid . . . ", The Journal of Services Marketing; Summer 1991; 5, 3; p. 19.

Guha, R., "Open Rating Systems," Technical Report, Stanford Knowledge Systems Laboratory, Stanford University, CA, USA, 2003, 10 pages.

Hart, David, "Researchers develop techniques for computing Googlestyle Web rankings up to five times faster," http://www.eurekalert.org/pub_releases/2003-05/nsf-rdt051303.php, 3 pages.

Haveliwala, Taher H., "TopicSensitive PageRank," believed to be published in Proceedings of the Eleventh International World Wide Web Conference, Honolulu, Hawaii, 2002, 10 pages.

Haveliwala, Taher H., et al., "An analytical comparison of approaches to personalizing PageRank," Technical report, Stanford University, 2003, 4 pages.

Haveliwala, Taher H., et al., "Computing PageRank using Power Extrapolation," Technical report, Computer Science Department, Stanford University, 2003, 12 pages.

Haveliwala, Taher H., et al., "The Second Eigenvalue of the Google Matrix," Technical report, Computer Science Department, Stanford University, 2003, 8 pages.

Heer, Jeffrey, "search (and destroy)," http://jheer.org/blog/archives/000006.html, Jul. 15, 2003, 5 pages.

http://www.k-praxis.com/archives/000037.html, "Blogs and Google: The Future of Categorized Indexes," May 10, 2003, 2 pages.

Kamvar, Sepandar, et al., "Adaptive Methods for the Computation of PageRank," Technical report, Stanford University, 2003, 15 pages.

Kamvar, Sepandar, et al., "The Condition Number of the PageRank Problem," Technical report, Stanford University, 2003, 4 pages.

Kamvar, Sepandar, et al., "The EigenTrust Algorithm for Reputation Management in P2P Networks," In Proceedings International WWW Conference, Budapest, Hungary, May 20-24, 2003, 12 pages.

Kamvar, Sepandar, et al., "Exploiting the Block Structure of the Web for Computing PageRank," Technical report, Stanford University, 2003, 13 pages.

Kamvar, Sepandar, et al., "Extrapolation Methods for Accelerating PageRank Computations," Technical report, Stanford University, 2003, 10 pages.

Moe, Wendy M., et al., "Using Advance Purchase Orders to Forecast New Product Sales," Marketing department, University of Texas—Austin, Jul. 2002, 33 pages.

Montaner, Miguel, "Opinion-Based Filtering Through Trust," technical paper, Institut d'Informatica I Aplicacions, Agents Research Laboratory, Universitat de Girona Campus Montilivi, 17071 Girona, Spain, 2002, 15 pages.

Morgan, Fred, Jr. "Are Early Triers Heavy Users?" The Journal of Business, vol. 52, No. 3 (Jul. 1979), pp. 429-434.

Olsen, Stefanie, "Are search engines confusing surfers?," http://news.com.com/2100-1024-5090701.html, Oct. 13, 2003, 4 pages.

Olsen, Stefanie, "AskJeeves denounces paid inclusion," http://news.com.com/2100-1024_3-5168805.html?tag=nefd_top, Mar. 4, 2004, 4 pages.

Olsen, Stefanie, "Searching for the personal touch," http://news.com.com/2100-1024_3-5061873.html, Aug. 11, 2003, 3 pages.

Orlowski, Andrew, "Google to fix blog noise problem,"http://www.theregister.co.uk/content/6/30621.html, Sep. 5, 2003, 4 pages.

Pavlov, Dimitry Y., et al., "A Maximum Entropy Approach to Collaborative Filtering in Dynamic, Sparse, High-Dimensional Domains," In Proceedings of the Sixteenth Annual Conference on Neural Information Processing Systems (NIPS-2002), 8 pages.

Pavlov, Dimitry, et al., "Mixtures of Conditional Maximum Entropy Models," Proceedings of the Twentieth International Conference on Machine Learning (ICLM-2003), Washington, DC, 2003, 8 pages.

Ramakrishnan, Naren, et al., "Privacy Risks in Recommender Systems," http://computer.org/internet/, IEEE Internet Computing, Nov.-Dec. 2001, pp. 54-62.

Robinson, Gary, "KnowledgeKnife A White Paper," Transpose, LLC, grobinson@transpose.com, 2001, 12 pages.

Robinson, Gary, "SongSifter," Disclosure from U.S. Appl. No. 60/345,548, filed Oct. 18, 2001, 14 pages.

Solomon, Mary, "Targeting Trendsetters: Cyberstudies capture the perceptions and insights of early adopters" Marketing Research Summer 1996, vol. 8, No. 2.

Tang, Tiffany C., et al.,"Scaling Down Candidate Sets Based on the Temporal Feature of Items for Improved Hybrid Recommendations," Eighteenth International Joint Conference on Artificial Intelligence, Aug. 9-15, 2003—Acapulco, Mexico, 8 pages.

http://www.teoma.com/, "Adding a New Dimension to Search: The Teoma Difference is Authority," Mar. 4, 2004, 6 pages.

Vucetic, Slobodan, et al., "A Regression-Based Approach for Scaling-Up Personalized Recommender Systems in E-Commerce," Workshop on Web Mining for E-Commerce, at the Sixth ACM SIGKDD Int'l Conf. on Knowledge Discovery and Data Mining, Boston, MA, Aug. 2000, 9 pages.

http://webword.com/weblog/001628.html by WebWord Mar. 16, 2003.

Woelflein, Mike, "Database Heroes," Mainebiz, Nov. 25, 2002, vol. 8, No. 24, Portland, Maine, 2 pgs.

Yu, Kai, et al., "Instance Selection Techniques for Memory-Based Collaborative Filtering," in: Proc. 2nd SIAM Int. Conf. on Data Mining (SDM '02), http://citeseer.ist.psu.edu/yu02instance.html, 16 pages.

Yu, Kai, et al., "Probabilistic Memory-Based Collaborative Filtering," IEEE Transactions on Knowledge and Data Engineering, found at: http://www.brauer.informatik.tumuenchen.de/~trespvol/papers/tkde_vu.pdf, Oct. 2004, 13 pages.

Zaiane, Osmar, "Database Management Systems," University of Alberta, CMPUT 391: Information Retrieval and the Web, Winter 2003, 9 pages.

Amazon Early Adopters List, http://web.archive.org/web/20030604040602/http://www.amazon.com/exec/obidos/tg/feature/-/423495, Jun. 4, 2003, 17 pages.

Amazon Game Boy Advance Product, http://web.archive.org/web/20030629184310/www.amazon.com/exec/obidos/tg/detail/B000087H7T?v=glance, Jun. 29, 2003, 10 pages.

Amazon Panasonic Product, http://web.archive.org/web/20030629210353/www.amazon.com/exec/obidos/tg/detail/B00009KXA3?v=glance, Jun. 29, 2003, 6 pages.

Wansink, Brian, Sea Bum Park; "Methods and Measures that Profile Heavy Users" Journal of Advertising Research, v40, n4, p. 61 Jul. 2000.

Non-Final Office Action dated Mar. 16, 2009, issued in U.S. Appl. No. 10/862,929, filed Jun. 7, 2004, 21 pgs.

Non-Final Office Action dated Jan. 8, 2008, issued in U.S. Appl. No. 10/862,929, filed Jun. 7, 2004, 20 pgs.

Non-Final Office Action dated Sep. 12, 2006, issued in U.S. Appl. No. 10/862,929, filed Jun. 7, 2004, 21 pgs.

Final Office Action dated Jul. 22, 2008, issued in U.S. Appl. No. 10/862,929, filed Jun. 7, 2004, 20pgs.

Final Office Action dated Apr. 2, 2007, issued in U.S. Appl. No. 10/862,929, filed Jun. 7, 2004, 19pgs.

Non-Final Office Action dated Oct. 29, 2008, issued in U.S. Appl. No. 10/862,930, filed Jun. 7, 2004, 22 pgs.

Final Office Action dated May 6, 2009, issued in U.S. Appl. No. 10/862,930, filed Jun. 7, 2004, 24pgs.

Non-Final Office Action dated Nov. 12, 2008, issued in U.S. Appl. No. 10/862,931, filed Jun. 7, 2004, 17 pgs.

Final Office Action dated May 5, 2009, issued in U.S. Appl. No. 10/862,931, filed Jun. 7, 2004, 28pgs.

Non-Final Office Action dated Mar. 4, 2009, issued in U.S. Appl. No. 10/863,642, filed Jun. 7, 2004, 18 pgs.

Non-Final Office Action dated Apr. 28, 2009 issued in U.S. Appl. No. 10/863,742, filed Jun. 7, 2004, 32 pgs.

Non-Final Office Action dated Mar. 28, 2008 issued in U.S. Appl. No. 10/863,742, filed Jun. 7, 2004, 14 pgs.

Non-Final Office Action dated Mar. 4, 2009 issued in U.S. Appl. No. 11/123,415, filed May 6, 2005, 22 pgs.

Non-Final Office Action dated Jul. 12, 2007 issued in U.S. Appl. No. 11/23,415, filed May 6, 2005, 14 pgs.

Dan Ariely et al.,"Which Intelligent Agents Are Smarter? An Analysis of Relative Performance of Collaborative and Individual Based Recommendation Agents," unpublished manuscript, Massachusetts Institute of Technology, 2000, 54 pages.

John Battelle, "An Open Source Search Engine," http://searchenginewatch.com/searchday/print.php/34711_3071971, Mar. 21, 2004, 4 pages.

H. Berger, et al., "An Accommodation Recommender System based on Associative Networks," In A. J. Frew, editor, *Proceedings of the 11th International Conference on Information Technologies in Tourism* (ENTER 2004), Cairo, Egypt, Jan. 26-28, Springer-Verlag, 12 pages.

Craig Boutilier et al., "Online queries for collaborative filtering," believed to be published in *Proceedings of the 9th International Workshop on Artificial Intelligence and Statistics* (AISTAT-2003), 2003, 8 pages.

S. Chinmayee, "All search engines are biased," http://www.ciol.com/content/news/2003/103081408.asp, Aug. 14, 2003, 3 pages.

Dan Cosley et al., "REFEREE: An open framework for practical testing of recommender systems using ResearchIndex," believed to be published in *Very Large Database* (VLDB '02) Conference, China, 12 pages.

Dan Cosley et al., "Is Seeing Believing? How Recommender Interfaces Affect Users' Opinions," believed to be published in *Proceedings of CHI 2003*, 8 pages.

James Dana et al., "Revenue Sharing and Vertical Control in the Video Rental Industry," (with Kathryn Spier), believed to be published in *Journal of Industrial Economics*, vol. XLIX, No. 3, Sep. 2001, 36 pages.

Chrysanthos Dellarocas, "Mechanisms for coping with unfair ratings and discriminatory behavior in online reputation reporting systems," *Proceedings of the twenty-first international conference on Information systems*, 2000, pp. 520-525.

Ayhan Demiriz, "Analyzing service order data using association mining," Technical Report, 5 pages.

H. Fagrell, "IntraNews: A News Recommending Service for Corporate Intranets," believed to be published in *Proceedings of CSCWD 99*, Compenge, France, 7 pages.

Jeremy Goecks et al., "NuggetMine: Intelligent groupware for opportunistically sharing information nuggets," believed to be published in *Proceedings of IUI '02*, ACM Press, 2002, pp. 87-94.

Ken Goldberg et al., "Eigentaste: A Constant Time Collaborative Filtering Algorithm," believed to be published in *UCB Electronics Research Laboratory Technical Report* M00/41, University of California, Berkeley, 2000, 11 pages.

Stephan ten Hagen, et al., "Exploration/exploitation in adaptive recommender systems," believed to be published in *Proceedings of the third European Symposium on Intelligent Technologies, Hybrid Systems and their implementation on Smart Adaptive Systems*, Finland, 2003, 8 pages.

Anick Jesdanun, "Hooked on Search: The trusted name in Web trolling," Associated Press, Mar. 21, 2004, 4 pages.

Linda Knapp, "Search internet on your own terms," http://seattletimes.nwsource.com/html/businesstechnology/2001883991_ptgett20.html, 3 pages.

W. S. Lee, "Collaborative learning for recommender systems," believed to be published in *Proc. of The 18th Int'l Conf. on Machine Learning*, 2001, 8 pages.

Joseph F. McCarthy, "The Virtual World Gets Physical: Perspectives on Personalization," *IEEE Internet Computing* 5(6): 48-53 (2001).

S. E. Middleton et al., "Capturing knowledge of user preferences: ontologies in recommender systems," believed to be published in *In International Conference on Knowledge Capture* (K-Cap '01), pp. 100-107. ACM Press. New York, 2001.

Netflix Press Release, "Personalized Movie Recommendor Provides Netflix Visitors With Highly Accurate Film Recommendations Based on Their Individual Movie Taste History," http://www.netflix.com/Static?id=1019, Jan. 25, 2000, 2 pages.

The Nutch Organization, "About," http://www.nutch.org/docs/en/03/21/2004, 1 page.

The Nutch Organization, "FAQ," http://www.nutch.org/docs/en/faq.html, Mar. 21, 2004,3 pages.

The Nutch Organization, "Organization," http://www.nutch.org/docs/en/org.html, Mar. 21, 2004, 2 pages.

The Nutch Organization, "Status," http://www.nutch.org/docs/en/status.html, Mar. 21, 2004, 1 page.

Michael O'Mahony et al., "Collaborative recommendation: A robustness analysis," believed to be published in *ACM Transactions on Internet Technology*, 2003, 33 pages.

Duncan Pemberton et al., "GroupMark: A WWW Recommender System Combining Collaborative and Information Filtering," Presented at UI4ALL 2000, Florence, Italy Oct. 25-26, 2000, 13 pages.

Bob Price et al., "A Bayesian Approach to Imitation in Reinforcement Learning," believed to be published in *Proceedings of the 20th International Joint Conference on Artificial Intelligence* (IJCAI-2003), 6 pages.

A. M. Rashid et al., "Getting to know you: Learning new user preferences in recommender systems," believed to be published in *Proceeding of the International Conference on Intelligent User Interfaces*, 127-134, 2002.

Naren Ramakrishnan et al., "When being Weak is Brave: Privacy Issues in Recommender Systems," Technical paper posted on the Computing Research Repository at http://xxx.lanl.gov/abs/cs.CG/0105028, May 18, 2001, 12 pages.

Paul Resnick, et al., "Recommender systems," introduction to special section of *Communications of the ACM*, Mar. 1997, vol. 40(3), 3 pages.

J. Ben Schafer, et al., "E-Commerce Recommendation Applications," *Data Mining and Knowledge Discovery* 5(1/2): 115-153 (2001).

J.B. Schafer, "Chapter 3: a taxonomy for recommender systems," thesis paper, 31 pages.

Rashmi Sinha, http://www.info-arch.org/lists/sigia-1/0301/0524.html, Jan. 28, 2003, 3 pages.

Sander Spek, "Personalisation," *Institute for Knowledge and Agent Technology*, Feb. 2003, 5 pages.

Kirsten Swearingen et al., "Interaction design for recommender systems," (DIS2002), London, Jun. 25-28, 2002, 10 pages.

Y.Z. Wei et al., "Market-Based Recommendations: Design, Simulation and Evaluation," believed to be published in *Proceedings of The Fifth International Workshop on Agent-Oriented Information Systems* (AOIS-2003), Melbourne, Australia, 8 pages.

David Winer, "Nutch, an opensource search engine," http://davenet.scripting.com/2003/08/13/nutchAnOpenSourceSearchEngine, Aug. 13, 2003, 4 pages.

Ka-Ping Yee et al., "Faceted Metadata for Image Search and Browsing," believed to be published in *Proceedings of the ACM Conference on Computer-Human Interaction*, 2003, 8 pages.

Jeffrey Zaslow, "If TiVo Thinks You Are Gay, Here's How to Set It Straight," http://online.wsj.com/article_email/0,,SB1038261936872356908,00.html, Nov. 26, 2002, 4 pages.

Chau, Patrick Y.K., and Hui, Kai Lung, "Identifying Early Adopters of new IT products: A case of Windows 95", Information & Management 33 (1998) 225-230.

Daniel Jr., Harold Zane, "The Role of MARKR-Entry Timing in the Evaluation of Manufacturing Technology Innovations", dissertation, University of Connecticut, 1997, 316 pages.

Final Office Action dated Aug. 24, 2009, issued in U.S. Appl. No. 10/862,929, filed Jun. 7, 2004, 14pgs.

Notice of Allowance dated Nov. 2, 2009, issued in U.S. Appl. No. 10/862,929, filed Jun. 7, 2004, 14 pgs.

Non-Final Office Action dated Nov. 10, 2009, issued in U.S. Appl. No. 10/862,930, filed Jun. 7, 2004, 29 pgs.

Final Office Action dated Sep. 16, 2009, issued in U.S. Appl. No. 10/863,642, filed Jun. 7, 2004, 20 pgs.

Notice of Allowance dated Aug. 20, 2009 issued in U.S. Appl. No. 11/123,415, filed May 6, 2005, 7 pgs.

* cited by examiner

SYSTEM AND METHOD FOR INFLUENCING RECOMMENDER SYSTEM & ADVERTISING BASED ON PROGRAMMED POLICIES

RELATED APPLICATION DATA

The present application claims the benefit under 35 U.S.C. 119(e) of the priority date of Provisional Application Ser. No. 60/476,341 filed Jun. 6, 2003, which is hereby incorporated by reference.

FIELD OF THE INVENTION

The present invention relates to electronic commerce systems and methods of influencing behavior of automated interactive software agents. The invention has particular applicability to applications in which items are recommended to online users on websites over the Internet.

BACKGROUND

Recommender systems are well-known in the art as a form of intelligent software agent, which operates to provide specific "recommendations" to users (typically consumers) of goods and/or services that are predicted to be of interest. A number of commercial implementations can be found in the prior art, including at Internet commerce sites operated by Yahoo!, Amazon, EBay, and Netflix, and by electronic program managers, such as TiVo.

In general, recommender systems operate using one or more basic methodologies, which can be classified basically as collaborative filtering (CF) based, content based (CN) or a hybrid of the two. In the case of CF, the user's interests are determined through a variety of mechanisms, including demographic profiling, explicit and implicit data gathering, ratings for items, etc., to generate a profile. The user is then compared against other users with a similar profile, to see if there are items which the user may not be aware of, but which are rated highly by others like him/her. Thus, the comparison and analysis for collaborative filtering is basically between individuals.

In the content based filtering schemes, the primary focus is similarity between items, with little regard for the types of persons who prefer the item. In other words, the recommender merely attempts to correlate pairs of items, so that, for example, if two items are highly correlated (i.e. meaning that the selection of one is often accompanied by the selection of the other) the system can inform the user of such fact. Thus, the comparison is primarily between items.

One aspect of recommender systems that is not addressed in the prior art is a mechanism for biasing or influencing recommendations based on some external parameter that is unrelated to the individual's correlation with other individuals, and unrelated to the characteristics of the item. For example, it is well-known in the art to implement so-called "pay for placement" features and polices in, among other places, Internet based search engines. In some cases, a company can "buy" a high ranking for one or more keywords, so that, for instance, when a user visits a particular website and enters a query into a search engine (say on topic A), such site provides responsive material to such user from sources in accordance with which companies have paid a premium to be associated with topic A.

Thus, Apple Computer company may reserve and pay consideration to a search engine provider to make certain that any queries involving the word "apple" will always contain (and in some cases highlight or showcase) a "hit" to web page, ad or other content from Apple. In this fashion, a company can influence or bias a search engine to produce results that favor presentation of content from one source over another, regardless of any other correlations that may exist to the underlying query.

Accordingly, while such systems exist for influencing a user's selection of content or purchases based on keyword searches, there is an unmet need for a system or method for influencing a recommender system in a similar fashion. Clearly it would be desirable if a company could influence a purchaser while he/she is reviewing content, such as by recommending content that is characterized by some quality such as the origin of the content. In this way, originators/suppliers of such content (be it goods, services, etc.) can benefit from a treatment within a recommender system environment that is similar to that afforded to the aforementioned search engine applications. Again, since the origin of a product/service is not considered by a typical recommender system, the prior art provides no mechanism for this type of functionality.

SUMMARY OF THE INVENTION

An object of the present invention, therefore, is to overcome the aforementioned limitations of the prior art.

Another object is to implement a recommender system that uses a form of programmed placement policy or bias in providing recommendations to subscribers.

An aspect of the invention, therefore, concerns a method of operating a recommender system, which recommender is used for recommending items of interest to users interacting with an online service provider. The method generally comprises the steps of: setting up one or more policies to be used for influencing recommendations made by the recommender system to a user; responding to a request for a recommendation; causing the recommender system to use at least one of the one or more policies when presenting one or more policy influenced recommendations to the user in response to the request.

Generally speaking, the policy is used to provide a preference to a policy holder, the reference being either a preference filter to be used against a list of recommendation items generated by the recommender system, and/or a presentation preference for one or more items associated with the policy holder and which are part of the list of recommendation items. The policy can be defined with reference to a period of time in which the policy is to be used; one or more keywords; one or more demographic variables associated with the user; a type characteristic associated with each of the items recommended by the recommender system; a release date associated with the items recommended by the recommender system; and/or with reference to a brand or source of the items recommended by the recommender system.

In a preferred approach the one or more policies are considered after a recommender system has generated an initial list of uninfluenced recommendations. However, in some cases it may be more desirable to consider and implement the policy before the initial list is created.

In some applications, an additional step can be performed of evaluating the one or more policies under a cost—benefit analysis to determine an appropriate policy to be used for the user. A different policy can be used for each request for a recommendation made by the user, so that the one or more policies are utilized on a request by request basis. In some instances it may be desirable to compare a policy influenced recommendation to the user against a recommendation made by the recommender system in the absence of considering the one or more policies.

A policy record for a selected policy is updated within a policy log when a recommendation is made to the user based on such selected policy. For some embodiments it may be desirable to generate a report of a number of recommendations made by a recommender system broken down according to a type of policy used for such recommendations.

In some preferred embodiments, multiple policies are evaluated for each recommendation made by the recommender system. Some of the policies may include a fulfillment requirement, so that the recommender system is forced to generate a certain number of recommendations based on the first one of the policies. In other cases, the policies may be selected on a controlled opportunity basis to influence recommendations, such that a first policy can have a higher percentage chance of influencing a recommendation compared to a second policy.

A related aspect of the invention is a method which controls advertising material presented to the user with the one or more recommendations based on which of the one or more policies is used to generate to the one or more recommendations.

Another aspect of the invention concerns a recommender system which is programmed with the above policy methods in the form of various software routines. The recommender system is typically implemented at an e-commerce website. However, in some applications the recommender system is implemented at least in part in a client computing device, including a programming receiver. The recommendation is typically associated with a book, a movie, an auction item, or a content item.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions.

DETAILED DESCRIPTION

Figure 1:
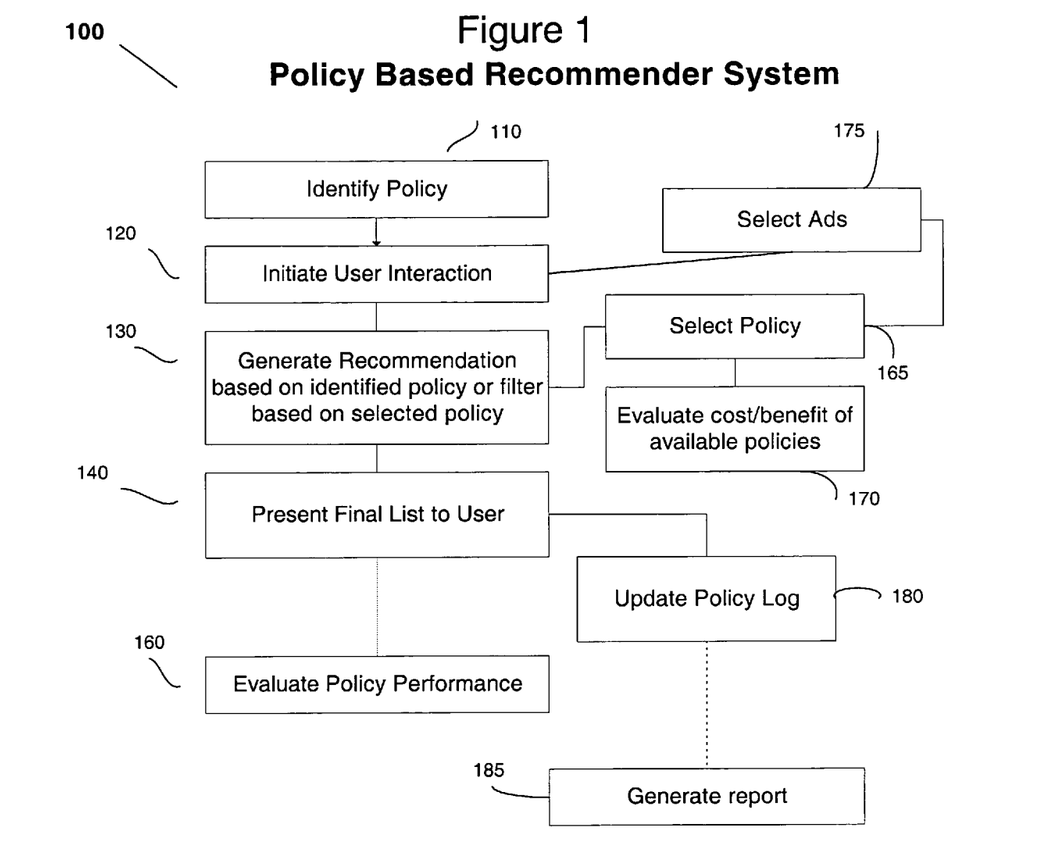
FIG. 1 is an illustration of a preferred process utilized to influence behavior and recommendations of a recommender system through a programmed policy in accordance with the present invention.

A preferred process for influencing the behavior and recommendations of a recommender system through a programmed policy, such as a pay-for-placement bias is illustrated in FIG. 1. The recommender system which can be used with the present invention includes any of a number of well-known types of software agents which operate at an e-commerce website and process a person's explicit and implicit inputs to generate a suggestion to the person for one or more items, including the types referred to above.

These recommender systems typically interact with a subscriber over a network (such as the Internet), as part of a World Wide Web (WWW) web page on a website, and which is presented within a client device (i.e., some form of computing system) within a browser software program. In some cases, however, a recommender may be built in as part of an electronic programming guide or manager, as in the case of certain television/satellite receivers. The details of such recommender systems, their programming, etc., and the specifics of the hardware which implement the same—namely, servers, client devices, browsers, and WWW page codings are well known, and are not material to the present invention. For examples, see e.g., U.S. Pat. Nos. 6,515,681; 6,064,980 and 5,583,763 which are hereby incorporated by reference. Those skilled in the art will appreciate that any conventional implementation can be used with the present invention.

Furthermore, as concerns the inventive process below, again, as noted herein, such process is expected to be embodied in a variety of software programs, routines, etc., that run on one more computers coupled to the Internet. In other embodiments these programs and routines will run directly on a computing machine at the subscriber's premises, such as a digital video recorder, receiver, etc. The actual implementation details will vary from platform to platform, can be designed and effectuated by persons skilled in the art from ordinary skill in this field, and are thus not material to the present discussion.

As seen in FIG. 1, a recommender system influence policy is defined and provided to a recommender system at step 110. The basic types of influence policies are described further below, and can include, for example, a pay-for-placement policy. Generally speaking, these policies, when implemented in software as part of a filtering mechanism, can be considered a form of influencer engine.

At step 120, a subscriber to the website interacts with the recommender system in a conventional fashion, and so as to elicit a recommendation. For example, in the context of a movie rental website, the subscriber may request a suggestion for titles in a drama genre.

A recommendation is then provided to the user at step 130. Unlike a conventional recommendation, however, the recommendation in this instance, however, is based on the recommender system's adoption of a specific policy provided at step 110.

It should be noted, of course, that the policy may be defined at step 110, but it may in fact only be effectuated later at step 130. In other words, instead of considering the policy to filter the recommendations ab initio as part of the initial selection process, the recommender system might alternatively generate a normal list of recommendations which are examined for compliance with the policy, and then packaged in accordance with the policy for presentation to the user. The latter may be preferable in some instances because an overlay type system can avoid conflicts and re-designs of commercial recommender system software packages.

In any event, those skilled in the art will appreciate that the implementation details will vary from application to application. Furthermore, it should be noted, of course, that the policy defined at step 110 may in fact be selectively applied only at step 130 during specified times, and on a subscriber by subscriber, or item by item basis.

At step 140 the final list of recommended items is presented to the user, which, again, as noted above, could be a service, a movie title, a book title, an auction item, a consumer article, a content item, etc. Again, the recommendation may be in the form of a single item and/or a set of items. In the latter case the items may be visually arranged, sized, etc. in a manner that accentuates certain listings, or makes them more prominent in some fashion. The placement and presentation of such recommendations can also be the subject of a policy of the types described below.

In the context of a website, of course, such recommendations will be presented within a web browser, while, in the context of a home programming receiver the recommendations will be presented within an electronic programming guide interface. For PDAs and phones, of course, the presentations will be made within a conventional display. Again, the particular form and method of delivering the recommendations is not critical, and will vary in accordance with a computing platform used by the user to interact with the recommender system.

Finally, step 160 notes that the overall performance of the influencer policy is evaluated. For example, a log can be maintained of the number of times the recommendation could have been made under a policy, the number of times the recommendations were made under each influencer policy, and their adoptions by the persons seeing them, again, broken down by policy. An adoption rate then can be calculated to see the persuasiveness of the influencer engine. The influencer adoption rate can then be compared against adoption rates from non-influenced recommendations to see the relative effectiveness of the influencer engine.

In addition, an evaluation can be made to determine the relative "closeness" in each instance between a proposed recommender item, and an actual item recommended by the influencer engine. In other words, the "cost" to the website operator, in terms of an influencer imposed "error" on the recommender system can be calculated. The error can be determined, for example, by measuring an actual ranking for the policy-influenced recommend item for the person in question, as compared to the ranking for the item that would have been recommended to the person in question.

Again, in some implementations, the "error" might be evaluated in advance of presenting an actual recommendation as shown at step 170. In this way, if the error cost of presenting the influenced item is too great, the e-commerce operator can elect to veto the recommendation, and perhaps provide either an alternate "influenced" recommendation, or an uninfluenced recommendation.

In another variation, the recommender system can implement a selection process for identifying an appropriate influence engine at step 170. This would be useful in those cases where an e-commerce site operator has a variety of influence policies that can be used by third parties for use in a recommender system. For example, a first entity may purchase or request a first policy that biases a first type of item in its favor, so that a recommender system preferably identifies and recommends these types of items to users. A second entity may similarly purchase a second policy that biases a second type of item in their favor.

One method of selecting a policy, as noted below, is merely to randomly select a policy among a set of available policies, or to implement a scheduler based on a desired rate of presentation each policy.

Another method of deciding on an influence policy is to consider a cost/benefit analysis for each policy. Thus, at step 130, a recommender system may evaluate the relative cost of accommodating either the first policy or the second policy. In those instances where it is possible to consider alternative choices, an e-commerce site may thus elect to go with an option that minimizes an overall "cost" in terms of deviance from an optimal recommended item. This selection can be logged at step 180 to identify the recommendation, and the policy that is associated with the same. In this manner, the e-commerce operator can tabulate a number of recommendations provided pursuant to a policy to demonstrate compliance to a purchaser of the policy. The log can include a number of recommendations provided pursuant to each policy, as well as a total number of recommendations made. Again, in some cases an e-commerce operator may chose to not use any influence engine, to avoid potentially giving a poor recommendation.

This type of selection process, therefore, can minimize the cost to the recommender system operator, because it can elect, on a user by user, and item by item basis, to provide a recommendation that satisfies at least one given policy, and yet is not unacceptably expensive. In many cases, for example, a particular item mandated by a policy will be the same as a baseline recommendation that otherwise suggested by the recommender system. The baseline recommendation for a particular user may also, by default, incorporate demographic, geographic and similar data. If the e-commerce operator has the option of selecting between choices, and can pick the lowest cost item, this feature helps to improve the profitability of such site. Moreover in some instances, certain websites will identify common popular selections made by persons in the immediate geographic vicinity of the user (i.e., Amazon Purchase Circles). A baseline recommendation therefore, can include a number of other active influences under the control of the e-commerce operator which are outside the scope of any specific policy which is then used for comparison.

Figure 2:
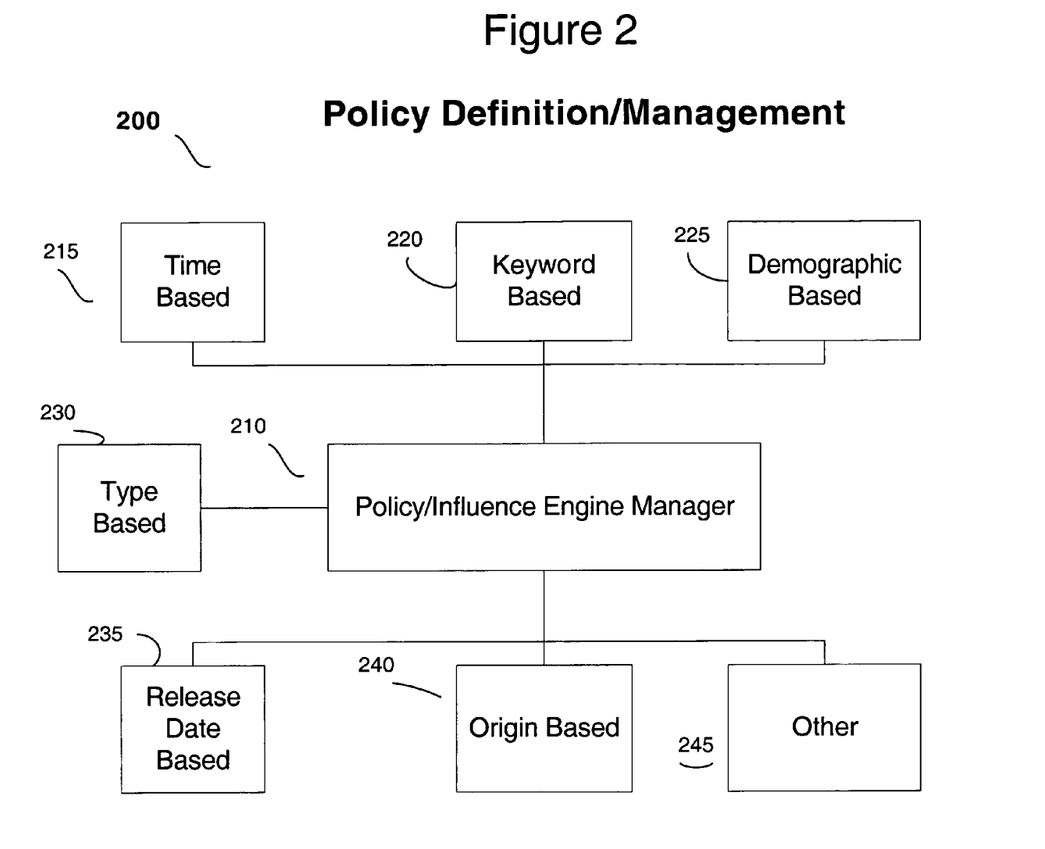
FIG. 2 illustrates the types of policies that can be used to influence a recommender system in accordance with the present invention.

FIG. 2 identifies a number of policy or influencer inputs that can be provided to an influence engine policy manager 210. The policies and influences may be conditioned or qualified, of course, so that a recommender system does not have to implement a particular policy in each instance. In fact, a policy might only need to be implemented based on satisfying a certain policy percentage threshold that is negotiated between the policy requester and the policy implementer (i.e., the e-commerce operator). For example, the policy percentage threshold may specify that the policy must be implemented in at least 50% of the situations in which it could be presented. The figure will vary of course from situation to situation, and the invention is not limited in this respect. Alternatively, a policy may be implemented or purchased based simply on a guaranteed bulk number of recommendations over an indefinite period. A number of other conventional options are easily integratable as well, and the present invention is not limited in this respect.

The policies which could be implemented include, for example: time based policies 215, keyword based policies 220, demographic based policies 225, type based policies 230, release data based 235, origin based 240, and other based 245. These policies can be described basically as follows.

First, a time based policy 215 may specify, for example, that a supplier of certain items will receive preferential treatment by a recommender system over a predetermined period of time, or during certain hours of the day. A keyword based policy 220 may specify, for example, that a supplier of certain items will receive preferential treatment by a recommender system for queries made subscribers which include certain key words. The use of pay for placement based on keywords is well-known in the art of search engine technologies; for further details, see U.S. Pat. No. 6,269,361: System and method for influencing a position on a search result list generated by a computer network search engine—which is hereby incorporated by reference. Many of the techniques discussed in such reference could be adopted here as well for influencing both a type and position of a recommendation provided by a recommender system.

A demographics based policy 225 could be based on the characteristics/profile of the user receiving the recommendation. For example, a policy might be triggered only when a subscriber meets certain criteria, such as an age range, an income range, a domain range, a geographic region, etc. Thus, when such policy is in place, a recommender system will give preference to items originating from the policy holder.

A type based policy 230 could be based on the characteristics of the item. For example, some media items may be classified by author, genre, topic, etc. A type based policy could specify that if the recommender generates an initial list of recommended items having a common characteristic (i.e., such as the same topic), the policy holder will be given a preference for their items meeting such characteristic.

In another instance, a release date based policy 235 could be based on the date of introduction of the item. For example, a policy holder of this type may be given a preference so that, to the extent new items may satisfy a recommendation requirement, only new items from such entity are recommended. Other more limited preferences could also be specified.

Another basic policy is an origin based policy 240, which could specify that a particular entity should receive priority over other content providers for items which otherwise meet certain criteria. Thus, for example, if a user requests a recommendation on a certain type of book, a recommender system could give a preference to content from certain policy holders.

Other policies will be apparent to those skilled in the art. Again, each of these policies may further be qualified by some absolute number of recommendations, so that a policy may be in force for a certain selected number of recommendations.

In all of the above, the preference given to the policy holder may be in the form of a filter (so that only the policy holder's items are displayed) or a priority in time of presentation, or positional preference on a screen, or ranking, or display characteristic (sizing or other visual enhancement). Other examples of providing a preference to effectuate a policy will be apparent to those skilled in the art.

It will be further apparent to those skilled in the art that multiple policies may exist at the same time, and that the influence engine policy manager must identify and evaluate such policies for a given set of recommendations to be presented to a subscriber. Furthermore, when a recommendation is made in accordance with a policy, a log of such must be made as well, so that a policy compliance report can be generated.

Thus in some cases it will be possible that one or more different types of policies may be implemented by an influence engine manager. As an example, both time based and type based policies may be in force at the same time. Furthermore, even within a single policy type, more than one policy may be in force. As an example, one entity may purchase one set of keywords for a keyword based policy 220, while another entity may purchase another set of keywords for a second keyword based policy.

When more than one policy is in place, these policies may be "eligible" for accommodation by an influence engine manager, and are considered, preferably, on a cost basis and/or a fulfillment basis. In other words, an e-commerce operator can evaluate the cost of supplying a particular recommendation in accordance with a policy, as well as the outstanding fulfillment obligation that may exist. A fulfillment obligation can arise from the fact that an e-commerce operator may be required to present either an absolute number of recommendations to subscribers in accordance with a policy, or a certain percentage over time, or in accordance with a given capacity. In other instances there may be no fulfillment obligation of course.

Thus, at any given moment, a set of policies (P1, P2 ... PN) is associated with a set of separate entities (E1, E2 ... EN), and a set of costs per recommendation charged by the e-commerce provider (C1, C2, ... CN), which can vary. For example, an e-commerce operator may charge more for a time based policy than a keyword based policy. The policies may, in some applications, be further associated with a set of corresponding fulfillment criteria (F1, F2, ... FN) which specify an existing compliance with a fulfillment obligation for the policy.

To ensure that certain policies are not left unsatisfied, a scheduling routine can be implemented for the policies as part of the influence manager. For example, a policy ranking can be done, based on examining the compliance log noted earlier, to examine which policies are most in need of being met. At any moment in time, the influence engine policy manager may select only the top X or top N % of eligible policies through such ordering process. Thus, the available policies are reduced by some number to a smaller subset of eligible policies based on a fulfillment requirement and a suitable conventional planning algorithm.

It is this smaller subset of eligible policies, therefore, which is evaluated for any particular recommendation by a scheduling routine. In one simple approach, policies can be rotated continuously in a round-robin fashion from highest to lowest. When a particular policy is satisfied with a given recommendation, this policy is then moved to the bottom of the eligible policy list.

Other examples and techniques will be apparent to those skilled in the art for scheduling a pool of policies. The only constraint, of course, is an e-commerce operator cannot use a set of policies that are inconsistent and/or impossible to satisfy at the same time. The manner in which the policies are satisfied, including an acceptable planning algorithm, can be determined on an application by application basis using techniques well known in the art of capacity planning.

In some instances an e-commerce operator may provide an influence placement per item that is not constrained by a fulfillment obligation, but is merely compensated for on a per item presentation basis. In these cases, of course, the policies may or may not be rotated, depending on the fee per presentation charged by the e-commerce operator. In such cases the e-commerce operator may factor in not only the error cost, but also the benefit (i.e. the cost charged to the policy requester for the recommendation) to maximize revenue for the e-commerce operator. That is, if the total estimated value for adopting a policy for a particular recommendation is $C_N - E_N$, where $C_N$ is a value to recommender for using policy N, and $E_N$ is a cost of an error of recommendation for policy N, then an e-commerce operator can select from a variety of policies for any given recommendation to maximize a recommendation based revenue.

In other instances, if the benefit of each recommendation is approximately the same, the e-commerce operator can use a round robin schedule noted above. Alternatively, the e-commerce operator can use a random number generator, combined with an individual weighting value for each policy, so that at any given moment in time, a set of policies that are randomly selected are considered eligible for consideration. Other examples will be apparent to those skilled in the art, and the invention is not limited to any particular variant.

Again, for each recommendation made, an e-commerce operator can note the policy used, and thus charge a particular policy requester in an appropriate amount. In some instances, an e-commerce operator may elect to tabulate an adoption rate for the recommendations as demonstrated by the subscribers. From such data, an e-commerce operator can detect, for example, a frequency by which policies are adopted, and a listing of the same from lowest to greatest frequency. This adoption frequency, in turn, can be used in a feedback manner to control the selection and consideration of policies on the front end of the recommender system, so that policies which are more likely to be adopted are given preference in consideration. This strategy has the effect of being beneficial to both the policy requester and the e-commerce site operator, since both are achieving greater recognition from the recommender system.

Finally, it is apparent that recommendations and advertisements can be correlated at certain e-commerce websites. For example, if a book title pertaining to automobiles is recommended to an online user, an advertising placement engine running at the website can also direct an automobile related ad to the user at the same time. These kinds of context based advertising methods are well-known in the art. In some instances, for example, if an advertiser is associated both with recommendation content and advertising content, the two can be correlated and reconciled during a recommendation request so that a supplier of a recommended item is also used for a source of advertising material.

It can be seen from the above that the present invention, through its influence on a recommender system, in fact can also significantly affect an advertising delivery campaign, and the type of ad that will be delivered in any instance to an online user. Consequently in some variations of the invention an advertising delivery system and a recommender system policy can be coordinated. Thus, the recommender system policy can also indirectly drive and control an advertising delivery system.

Consequently, as shown in FIG. 1, an optional step 175 determines whether to deliver an ad that is correlated to the recommender system policy. It should be noted that the selection of a particular ad can utilize essentially the same logic, strategy and process as noted above for selecting a recommendation policy. Accordingly, in instances where there is flexibility in providing a choice of ads, an e-commerce provider may elect to provide an ad that provides the highest revenue for given impression to such user.

As noted earlier, the above referenced policy based recommender system operated may be implemented in at an e-commerce site server, or they may be executed within a local computing device used by the subscriber, such as a PDA, an electronic program guide receiver (such as TiVo box), etc. In some instances, the recommender system processes and databases described above will be distributed between a client and server device to optimize performance and flexibility.

In some embodiments it may be desirable to allow individual users to opt in or out of recommender systems which use policy based recommendations. This election may be implemented on an application by application basis across different types of e-commerce sites. Where appropriate, conventional discounts, inducements, etc., known in the art could also be used to persuade persons to opt-in to such arrangements. For some applications it may be useful to display a table or list of comparative recommendations made by separate recommender systems, including policy based recommendations such as those of the present invention, compared to recommendations made by friends of the user, recommendations associated with persons living in the same area, recommendations associated with persons with similar demographics, etc. Other examples will be apparent to those skilled in the art.

It will be understood by those skilled in the art that the above is merely an example of a policy based recommender system and that countless variations on the above can be implemented in accordance with the present teachings. A number of other conventional steps that would be included in a commercial application have been omitted, as well, to better emphasize the present teachings.

The routines for implementing the policy identification, scheduling, selection and logging operations as described above can be implemented using any conventional software programs and routines available to skilled artisans, and the present invention is not limited to any specific embodiment thereof. Furthermore, it is expected that such routines will vary from computer to computer in actual commercial practice. To better illustrate the features of the present invention, other aspects of the exchange system have been omitted, and it will be understood that such system could include other options, features, entries, etc., that are not specifically shown.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of operating an online recommender system for recommending items of interest to users interacting with an online service provider, comprising:
   defining a pay-for-placement influence policy applicable to a third party advertiser;
   establishing a biasing policy based on the influence policy for influencing recommendations made by the recommender system to a user of the recommender system, wherein the biasing policy is representative of preferences of the third party advertiser, and biases the recommender system to recommend items associated with the third party advertiser;
   responding to a request for a recommendation; and
   applying the biasing policy to the recommender system when presenting a policy influenced recommendation in response to the request.

2. The method of claim 1, further comprising prior to said applying:
   evaluating a plurality of biasing policies under a cost-benefit analysis to determine an appropriate policy to apply,
   wherein cost in the cost-benefit analysis is an error cost, the error cost being a difference in ranking of a non-biased proposed recommendation and a pay-for-placement policy influenced recommendation, and a benefit is a cost charged to the third party advertiser for the policy influenced recommendation.

3. The method of claim 2, further comprising:
   controlling advertising material presented to the user with the policy influenced recommendation based on which of the plurality of biasing policies is used to generate the policy influenced recommendation.

4. The method of claim 2, wherein a different biasing policy can be used for each request for a recommendation made by the user, so that the plurality of biasing policies are utilized on a request by request basis.

5. The method of claim 1, further comprising:
   comparing a policy influenced recommendation to the user against a recommendation made by the recommender system in the absence of considering the biasing policy.

6. The method of claim 2, further comprising:
   updating a policy record for a selected biasing policy within a policy log when a policy influenced recommendation is made to the user based on said selected biasing policy.

7. The method of claim 6, further comprising:
   generating a report of a number of policy influenced recommendations made by the recommender system broken down according to a type of biasing policy used for the policy influenced recommendations.

8. The method of claim 1, wherein the preferences comprise at least one of a preference filter to be used against a list of recommendation items generated by the recommender system, and a presentation preference for a plurality of items associated with the third party advertiser and which are part of the list of recommendation items.

9. The method of claim 1, wherein the biasing policy is defined with reference to a period of time in which the biasing policy is to be used.

10. The method of claim 1, wherein the biasing policy is defined with reference to a keyword determining if and when the biasing policy is to be used.

11. The method of claim 1, wherein multiple biasing policies are evaluated for each policy influenced recommendation made by the recommender system.

12. The method of claim 1, wherein the recommender system is implemented at an e-commerce website.

13. The method of claim 1, wherein the recommender system is implemented at least in part in a client computing device, including a programming receiver.

14. The method of claim 1, wherein the biasing policy is considered after a recommender system has generated an initial list of uninfluenced recommendations.

15. The method of claim 1, wherein the biasing policy is utilized by a recommender system while formulating an initial list of recommendations.

16. The method of claim 1, wherein the biasing policy includes a fulfillment requirement, so that the recommender system is forced to generate a number of pay-for-placement policy influenced recommendations based on the biasing policy.

17. The method of claim 2, wherein the biasing policies are selected on a controlled opportunity basis to influence recommendations, such that a first policy can have a higher percentage chance of influencing a recommendation compared to a second policy.

18. A method of presenting advertising via an electronic device in conjunction with recommendations made by a recommender system, comprising:
    defining a pay-for-placement influence policy applicable to a third party advertiser;
    implementing a biasing policy based on the influence policy for influencing recommendations made by the recommender system to a user of the recommender system,
    wherein said biasing policy is representative of preferences of the third party advertiser, and biases the recommender system to recommend items associated with the third party advertiser;
    responding to a request for a recommendation; and
    presenting advertising content based on the biasing policy while presenting policy influenced recommendation to the user in response to the request.

19. The method of claim 18, wherein the request is made by the user during an online Internet session.

20. The method of claim 18, wherein the request is made by the user from a home based content receiver.

21. The method of claim 18, wherein advertising content is based on recommendation content presented in the policy influenced recommendation.

22. The method of claim 21, wherein the third party advertiser associated with policy influenced recommendation is automatically selected as a source of the advertising for the advertising content.

23. The method of claim 18, wherein the advertising content is presented based on a pay for placement request from the third party advertiser.

24. A recommender system operating on a website and programmed to provide recommendations to users for items in response to a request for a recommendation, comprising:
    a first software routine for defining a pay-for-placement influence policy applicable to a third party advertiser;
    a second software routine for establishing a biasing policy based on the influence policy for influencing recommendations made by the recommender system to a user of the recommender system,
    wherein the biasing policy is representative of preferences of the third party advertiser, and biases the recommender system to recommend items associated with the third party advertiser, and
    wherein the recommender system applies the biasing policy to present policy influenced recommendations to the user in response to the request for a recommendation.

25. A method of recommending items of interest to a user of an online service provider, comprising:
    maintaining a profile for a user at the online service provider, wherein the profile includes prior selections and/or ratings of items made by the user;
    providing one or more recommendations to the user using a recommender system which uses account profiles of users similar to the user to generate such recommendations;
    defining a pay-for-placement influence policy applicable to a third party advertiser;
    defining a first item which is to receive a preference from the recommender system based on the influence policy, wherein the preference biases the recommender system to recommend items associated with the third party advertiser; and
    selectively influencing the recommender system on a subscriber by subscriber basis, so that the first item is presented to a user in a policy influenced recommendation based on the preference when the user's profile meets criteria of the influence policy,
    wherein the influence policy can be used to present recommendations of items to the user which would not otherwise be presented by the recommender system to the user.

26. The method of claim 25, wherein the policy influenced recommendation is presented during an interactive online session.

27. The method of claim 26, wherein the policy influenced recommendation is positioned and/or displayed more prominently than other items presented in response to a recommendation request.

28. The method of claim 25, wherein the policy influenced recommendation is provided based on the first item being a new item.

29. The method of claim 25, wherein the policy influenced recommendation is provided only during a certain predefined time period and/or during certain times of the day.

30. The method of claim 25, wherein the criteria includes demographic characteristics which must be associated with the profile for the user.

31. A method of recommending items of interest to a user of an online service provider, comprising:
    maintaining a profile for a user at the online service provider, wherein the profile includes prior selections and/or ratings of items made by the user;
    providing recommendations in a first list to the user over an electronic communications network using a recommender system which uses account profiles of other users similar to the user to generate such recommendations;

defining a pay-for-placement influence policy applicable to a third party advertiser;

defining a first item which is to be recommended by the recommender system based on the influence policy and preference factors unrelated to the account profiles of other users, wherein the preference factors bias the recommender system to recommend items associated with the third party advertiser; and selectively influencing the recommender system such that the first item is presented, based on the influence policy and the preference factors, only to selected users residing within predefined geographic regions, wherein the influence policy can be used to present recommendations of items to the user which would not otherwise be presented by the recommender system over the electronic communications network to the user in the first list.

32. The method of claim 31, wherein the first item is a newly released movie.

33. The method of claim 31, wherein the first item is recommended in response to keywords used in requests for recommendations by users in the predefined geographic regions.

34. The method of claim 31, further comprising:
tabulating user selections of the first item made in response to the preference factors.

35. The method of claim 31, wherein the preference factors include an age of the user, such that the first item is presented only to selected users residing within predefined geographic regions who satisfy an age range criterion.

36. The method of claim 31, further comprising:
defining a second item which is to be recommended by the recommender system based on the influence policy and second preference factors unrelated to the account profiles of other users;

defining a schedule to be used in connection with recommending the first item and the second item, the schedule being based on a cost-benefit analysis performed on a subscriber by subscriber basis; and presenting one or both of the first item and the second item to the selected users residing within the predefined geographic regions based on the schedule.

37. A method of recommending items of interest to users of an online service provider, comprising:
defining a pay-for-placement influence policy applicable to a third party advertiser;

providing an influenced recommendation based on a biasing policy derived from the influence policy for a first item to a user over a network using a collaborative filtering based recommendation engine, wherein the biasing policy is representative of preferences of the third party advertiser, and biases the recommender system to recommend items associated with the third party advertiser, and wherein the first item is characterized by a first content associated with a first identifiable source of content; and providing an advertisement to the user which is correlated to the influenced recommendation, the advertisement being generated by an advertising delivery system and describing a second item to the user over the network, wherein the second item is characterized by a second content that is also associated with the first identifiable source of content, and wherein presentation of recommendations and advertisements are coordinated for users the user of the online service provider.

38. The method of claim 37, wherein the recommendation and the advertisement are presented at the same time.

39. The method of claim 38, wherein the recommendation and the advertisement are presented within a single web page.

40. A method of recommending items of interest to users of an online service provider, comprising:
defining a pay-for-placement influence policy applicable to a third party advertiser;

providing an influenced recommendation based a biasing policy derived from the influence policy for a first item to a user over a network using a collaborative filtering based recommendation engine, wherein the biasing policy is representative of preferences of the third party advertiser, and biases the recommender system to recommend items associated with the third party advertiser; and providing an advertisement to the user which is correlated to the recommendation, the advertisement being generated by an advertising delivery system and describing a second item to the user over the network, wherein the second item is related logically to the first item and is associated with a context presented the user in which the first item is presented, wherein presentation of recommendations and advertisements are coordinated for the user of the online service provider.

41. The method of claim 40, wherein the recommendation and the advertisement are presented at the same time.

42. The method of claim 41, wherein the recommendation and the advertisement are presented within a single web page.

43. A recommender system for recommending items of interest to users interacting with an online service provider, comprising:
means for defining a pay-for-placement influence policy applicable to a third party advertiser;

means for providing a biasing policy based on the influence policy to influence recommendations made by the recommendation system, wherein the biasing policy is representative of preferences of the third party advertiser, and biases the recommender system to recommend items associated with the third party advertiser;

means for responding to a request for a recommendation from a user; and means for implementing the biasing policy when presenting recommendations to the user in response to the request.

44. The recommender system of claim 43, further comprising:
means for presenting advertising content to the user based on the biasing policy when presenting recommendations to the user in response to the request.

45. A computer-readable medium having stored thereon, computer-executable instructions that, if executed by a computing device, cause the computing device to perform a method comprising:
defining a pay-for-placement influence policy applicable to a third party advertiser;

establishing a biasing policy based on the influence policy for influencing recommendations made by the recommender system to a user of the recommender system, wherein the biasing policy is representative of preferences of the third party advertiser, and biases the recommender system to recommend items associated with the third party advertiser;

responding to a request for a recommendation; and applying the biasing policy to the recommender system when presenting a policy influenced recommendation in response to the request.

46. A method for influencing a recommender system, comprising:

defining a pay-for-placement influence policy applicable to a third party advertiser;

specifying third party advertiser preferences from the influence policy;

implementing the third party advertiser preferences to bias the recommender system to items associated with the third party advertiser;

responding to a recommendation request from a user;

generating a policy influenced recommendation for the user by enforcing the influence policy;

presenting the policy influenced recommendation to the user; and evaluating performance of the influence policy.

* * * * *